Oct. 15, 1968 E. M. GALLE ETAL 3,405,770
DRILLING METHOD AND APPARATUS EMPLOYING
PRESSURE VARIATIONS IN A DRILLING FLUID
Filed May 25, 1966 7 Sheets-Sheet 1
PRIOR ART PRESENT INVENTION
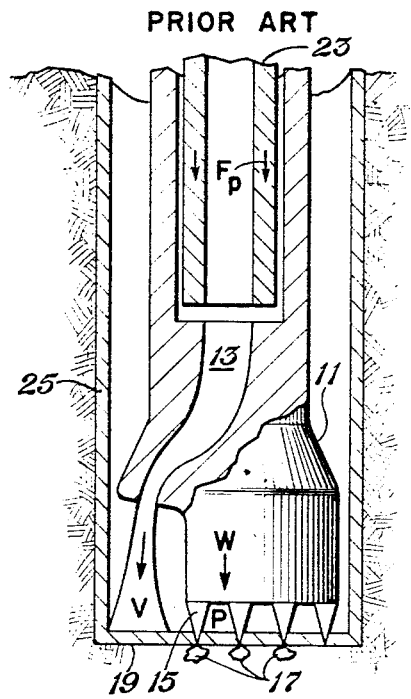
Fig. 1
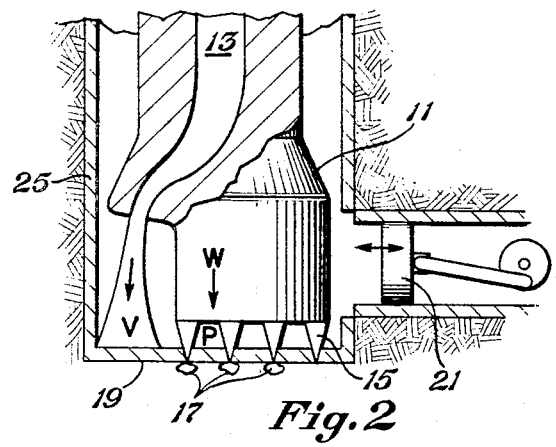
Fig. 2
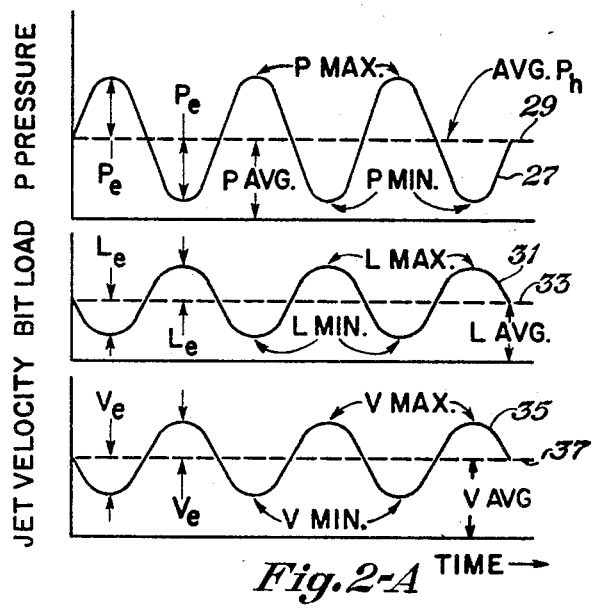
Fig. 2-A
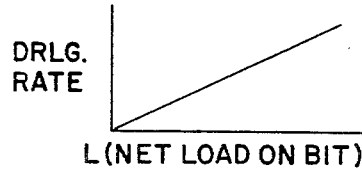
Fig. 1-A
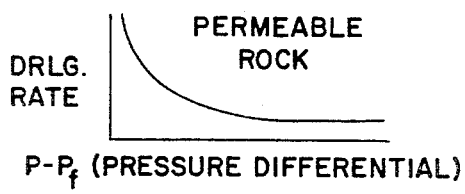
Fig. 1-B
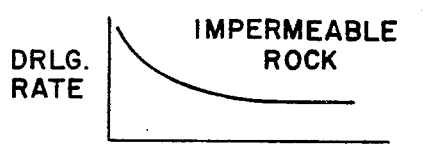
Fig. 1-C
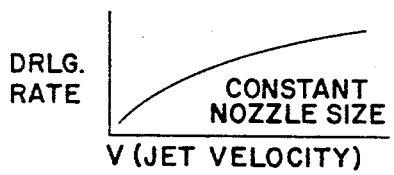
Fig. 1-D
Edward M. Galle
Henry B. Woods
INVENTORS
BY
Wofford & Felsman
ATTORNEYS Oct. 15, 1968  E. M. GALLE ETAL  3,405,770
DRILLING METHOD AND APPARATUS EMPLOYING
PRESSURE VARIATIONS IN A DRILLING FLUID
Filed May 25, 1966  7 Sheets-Sheet 4
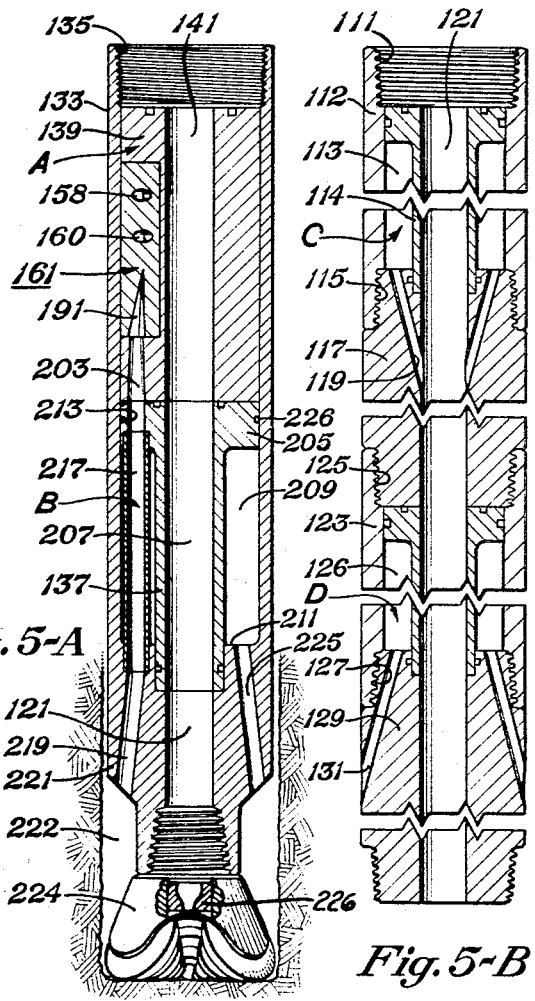
Fig. 5-A
Fig. 5-B
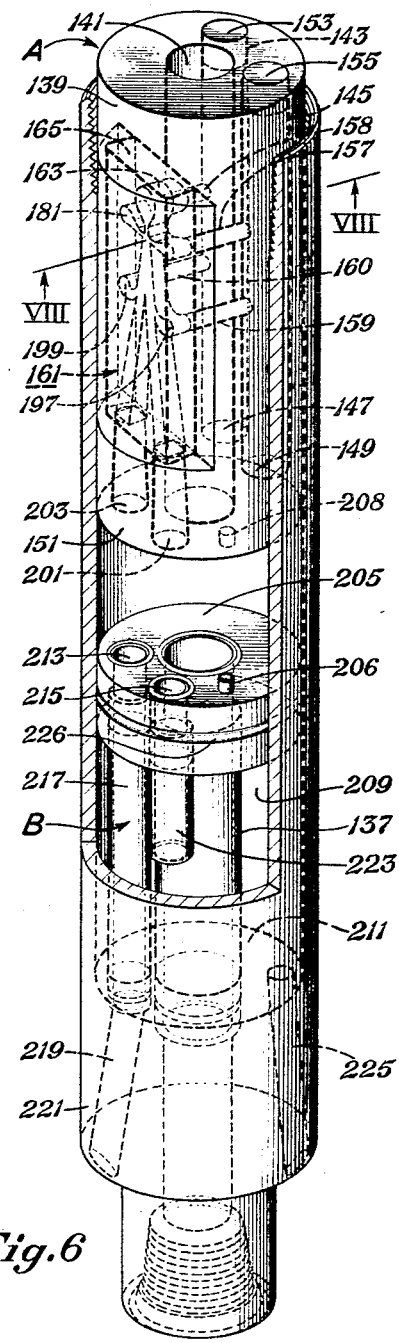
Fig. 6
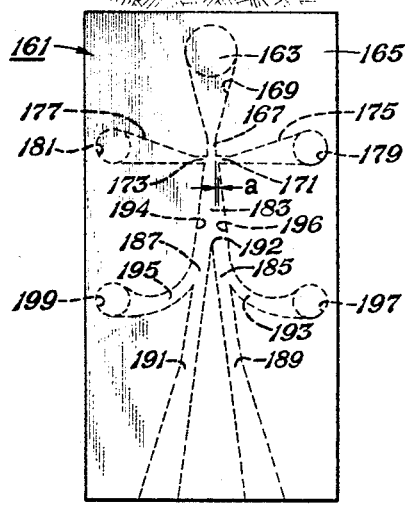
Fig. 7
Edward M. Galle
Henry B. Woods
INVENTORS
BY
Wofford & Felsman
ATTORNEYS Edward M. Galle
Henry B. Woods
INVENTORS

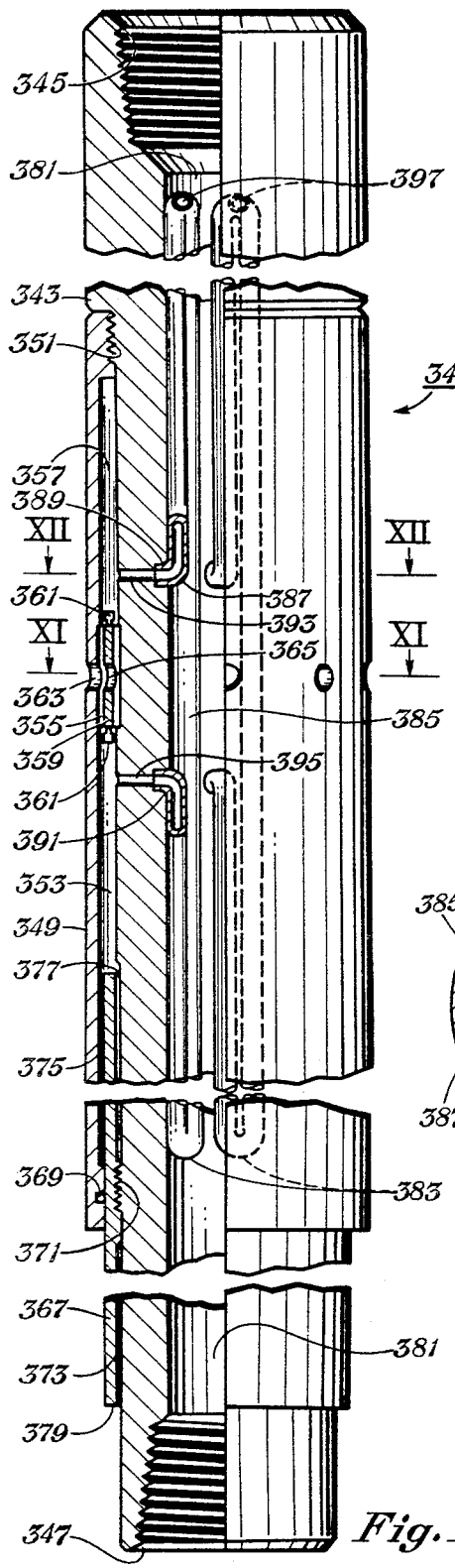
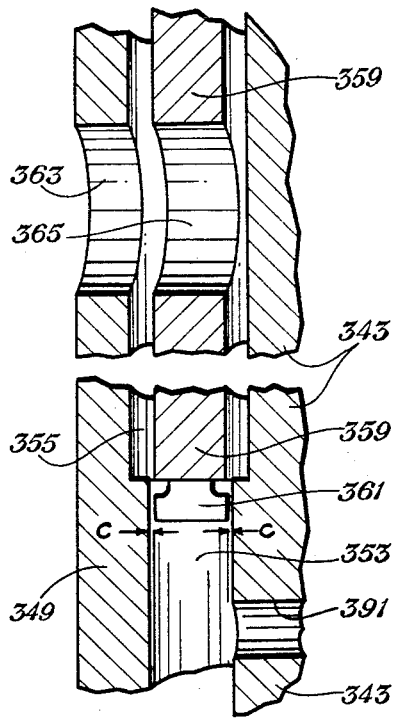
Fig. 13
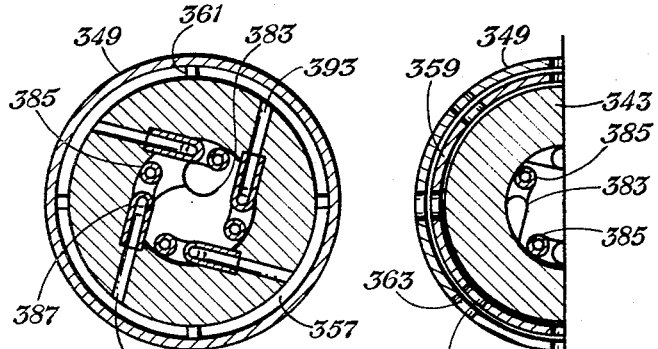
Fig. 12  Fig. 11
Fig. 10
Edward M. Galle
Henry B. Woods
INVENTORS
BY Wofford & Felsman
ATTORNEYS

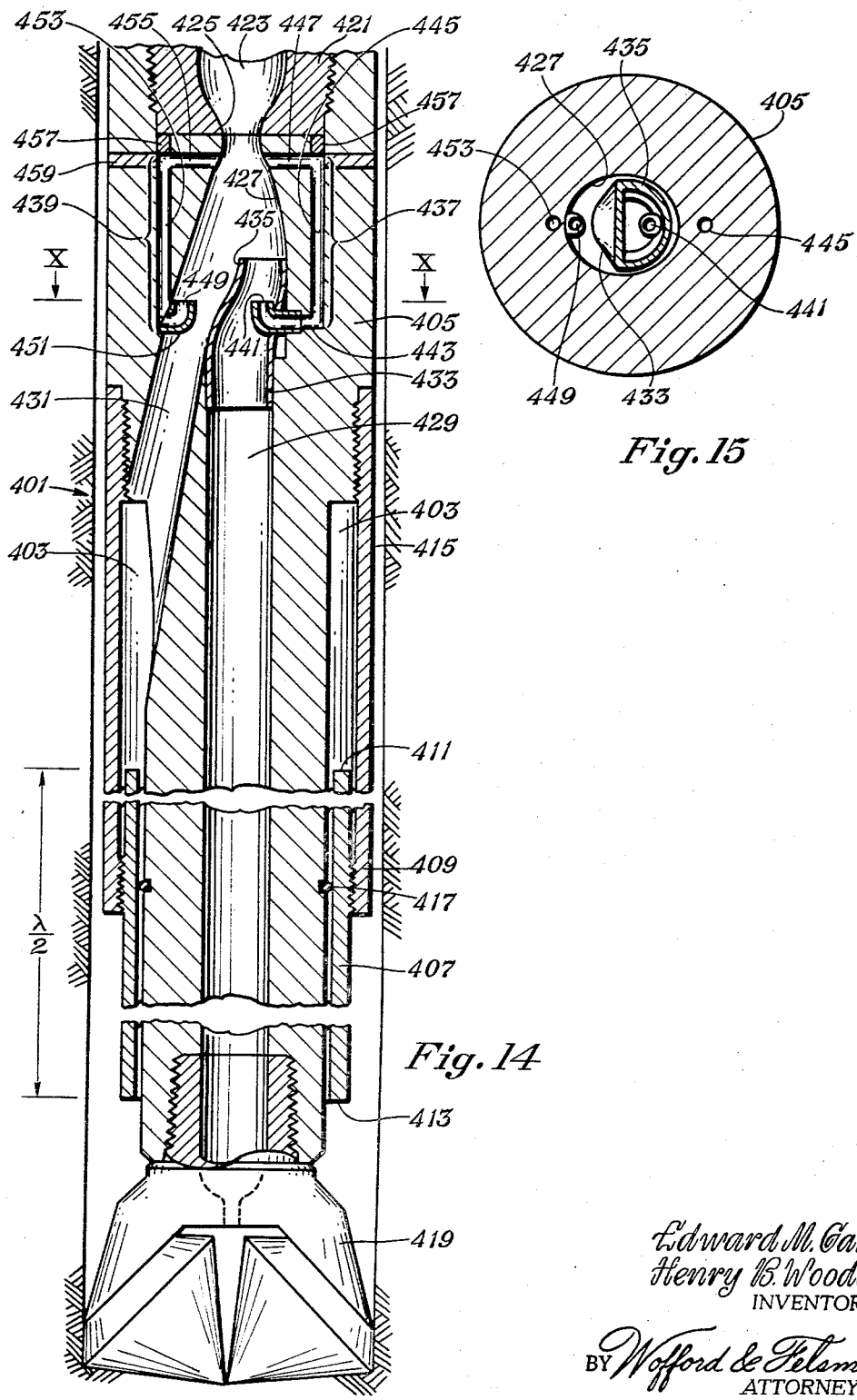

United States Patent Office 3,405,770
Patented Oct. 15, 1968

3,405,770
DRILLING METHOD AND APPARATUS EMPLOYING PRESSURE VARIATIONS IN A DRILLING FLUID
Edward M. Galle and Henry B. Woods, Houston, Tex., assignors to Hughes Tool Company, Houston, Tex.
Continuation-in-part of application Ser. No. 379,257, June 30, 1964. This application May 25, 1966, Ser. No. 552,788
33 Claims. (Cl. 175—56)

ABSTRACT OF THE DISCLOSURE

Following is disclosed improved means of drilling bore holes in the earth by effecting elastic vibrations in the drilling fluid surrounding a rotating drill bit. In preferred means fluid pressure at the bore hole bottom is cyclically decreased, while simultaneously jet velocity and bit load are cyclically increased. In addition, means in preferred fluidic forms (i.e., no moving mechanical structure) includes a bistable oscillator, a coupler and resonators which cooperate to provide large fluid pressure fluctuations near the bore hole bottom while minimizing acoustic energy transfer upward through the drilling fluid.

---

This is a continuation-in-part of a copending application, Ser. No. 379,257, filed June 30, 1964, now abandoned.

*Background and introduction*

In prior art vibratory drilling devices the major effort has been placed on generating elastic vibrations in the drill string or bit itself. As a secondary effect, these prior art devices cause fluid pressure variations in the drilling fluid of a nature usually detrimental rather than beneficial to the drilling rate, as will be explained later.

For one example of the above prior art technique, refer to Bodine's U.S. Patent No. 2,554,005. In this and many of this other publications Bodine discloses the use of an elastic or sonic vibration generator which creates a standing wave pattern of vibrations in an elastic bar which is actually one or more drill collars or the entire drill string. The bit secured to the bottom of the elastic bar therefore vibrates longitudinally, percussively striking the borehole bottom. As the bit force exerted against bottom is maximized, the bottom hole pressure is likewise maximized due to the downward movement of the bit, especially when incompressible fluids such as the common drilling muds are used. In other words, as the bit moves down into uncut rock, it squeezes the drilling fluid beneath it and thus creates a pressure fluctuation peaking simultaneously with the peak force pushing downward on the bit itself.

The problem with this and similar devices is that increases in bottom hole pressure decrease drilling rates. The beneficial result to be obtained by having a percussive bit action is at least partially lost due to the resulting cyclic increases in bottom hole pressure, which are in phase with the cyclic forces exerted by the bit against bottom. That is, when the bit moves downward to attack virgin formation, the bottom hole pressure suddenly increases and impedes downward progress.

For years it has been known that static reductions in bottom hole pressures increase drilling rates. For this reason air, gas, aerated muds, clear water, brines and other fluids lighter than the conventional drilling muds have become popular. Use of these newer drilling fluids permits completions of wells in a fraction of the time normally required with a heavy clay mud, with impressive reductions in cost. For many well known reasons, however, it is often impossible or impractical to use such fluids, as they lack such characteristics as high density, high gel strength, good water loss properties, etc., one or more of which is frequently inoperative, especially in deep wells and permeable formations.

One interesting attempt to reduce the bottom hole pressures statically, but while using conventional drilling muds, is shown in Williams' U.S. Patent No. 2,946,565. He uses a seal that spans the drill pipe and the wall of the hole just above the bit and operates in conjunction with an eductor that diverts some of the drilling mud from the mud moving downward in the central passage of the drill string and discharges it into an auxiliary peripheral passage that short circuits the seal. For some reason this approach has not yet succeeded commercially, though it is theoretically sound. It is undoubtedly difficult to develop a seal that can withstand the abuse of continuous contact with the abrasives found in most wells.

Another approach in attempting to beneficially reduce bottom hole pressure is shown in Nelson's U.S. Patent No. 3,185,227. His approach is to periodically interrupt the fluid flow in the drill pipe with a mechanical, fluid operated valve. Apparently the velocity head of the fluid flowing up the annulus evacuates the drilling fluid around the bit when the fluid flow through the bit is interrupted, thereby reducing bottom hole pressure. Such abrupt changes in the fluid flow in the annulus would tend to be detrimental to the filter cake on the bore wall and bore hole bottom. Also, stopping the fluid flow through the drill string and drill bit would decrease the jet velocity at the instant the bottom hole pressure decreases. This is disadvantageous as will become more fully apparent hereinafter.

*Broad description of method*

The present invention is based on the concept and subsequent substantiating discovery that pressure variations obtained in the drilling fluid at the borehole bottom by means of an elastic vibration generator coupled directly to the drilling fluid may be used to increase the drilling rate when using otherwise conventional rotary drilling techniques. Such pressure variations have amplitudes greater than the random and relatively weak pressure fluctuations inherent in the ordinary movements of the drill string members on the conventional rotary rigs during drilling and are cyclic in nature and at selected amplitudes and frequencies.

By generating pressure variations directly in the drilling fluid in the cavity surrounding the bit, the bit is forcefully drawn into the bottom of the hole by the cyclic decreases in the bottom hole pressure and resulting suction effect. A reduction in drilling fluid pressure under the drill bit reduces the upward force on the drill string, permitting more of its weight to rest on the bit and the bottom of the hole. In addition, when the bottom hole pressure cyclically decreases, the velocity of the drilling fluid being jetted from the bit is cyclically increased. Thus, the present invention simultaneously causes cyclic reductions in bottom hole pressure, cyclic increases in bit load, and cyclic increases in jet velocity. Surprisingly, even though during other portions of a complete pressure cycle there are simultaneous cyclic increases in bottom hole pressure, cyclic decreases in bit load and cyclic decreases in jet velocity, the drilling rate is nevertheless substantially increased.

*Objects*

It is accordingly the general object of the invention to provide improved methods for drilling boreholes in the earth.

Another object of the invention is to improve drilling rates in otherwise conventional rotary drilling by simultaneously and cyclically reducing bottom hole pressure and jet velocity.

Another object of the invention is to improve the rate of drilling boreholes in the earth by simultaneously and cyclically reducing bottom hole pressure, increasing jet velocity, and increasing bit load.

Another object of the invention is to improve drilling rates in otherwise conventional rotary drilling by simultaneously and cyclically reducing bottom hole pressure and increasing bit load.

Another object of the invention is to improve drilling rates in otherwise conventional rotary drilling by generating acoustic or elastic vibrations and coupling these vibrations with the drilling fluid in the cavity surrounding a drilling bit and thus downstream from the bit nozzles.

Another object of the invention is to provide apparatus which may be used to generate acoustic or elastic vibrations and effectively couple these vibrations with the drilling fluid in the cavity surrounding a drilling bit.

Another object of the invention is to provide means for coupling an acoustic or elastic vibration generator to the fluid in the cavity surrounding the drill bit without need for moving solid mechanical components.

Another object of the invention is to provide a combination of components which may be employed in otherwise conventional rotary drilling to increase drilling rates, said components cooperating to produce acoustic or elastic vibrations, to couple these vibrations with the drilling fluid in the cavity surrounding a drilling bit, and to do so effectively and efficiently by preventing loss of acoustic energy through the drill string or the drilling fluid in the annulus.

These and other objects are effected by the invention as will be apparent from the above and following descriptions taken in accordance with the accompanying drawings, forming a part of this application, in which:

Description of figures

FIGURE 1 is a schematic view of a prior art technique of vibrating the drill bit;

FIGURES 1–A through 1–D illustrate graphically the effect on drilling rate of varying the bit load, pressure differential across the borehole bottom, fluid pressure, and jet velocity;

FIGURE 2 illustrates schematically the broad concept of the invention;

FIGURE 2–A contains three curves showing how the bottom hole pressure, bit load, and jet velocity vary with time under the influence of an elastic vibration generator coupled directly to the drilling fluid in the cavity surrounding the bit;

FIGURES 5–A and 5–B are a longitudinal section view illustrating one form of elastic vibration generator, coupling device, and related equipment which may be used in practicing the method of the invention;

FIGURE 6 is a perspective view of that portion of the apparatus shown in FIGURE 5–A, with a portion thereof broken away to expose its interior. The upper, elastic vibration generator portion of the apparatus is shown lifted from the normal operating position of FIG. 5–A to add clarity to the drawing.

FIGURE 7 is a view of a portion of a fluid oscillator, which is one component of the apparatus shown in FIGURES 5–A and 6;

FIGURE 10 illustrates a hydroacoustic transducer, which is one type of elastic vibration generator that may be used in practicing the invention;

FIGURES 11 and 12 are sectional views taken along the respective lines XI—XI and XII—XII of FIGURE 10;

FIGURE 13 is a fragmentary sectional view showing in greater detail the lower end of the valve of FIGURE 10;

FIGURE 14 illustrates another type elastic vibration generator which may be used in practicing the invention; and FIGURE 15 is a cross sectional view as seen looking along the lines XV—XV of FIGURE 14.

Detailed description of method

Figure 3:
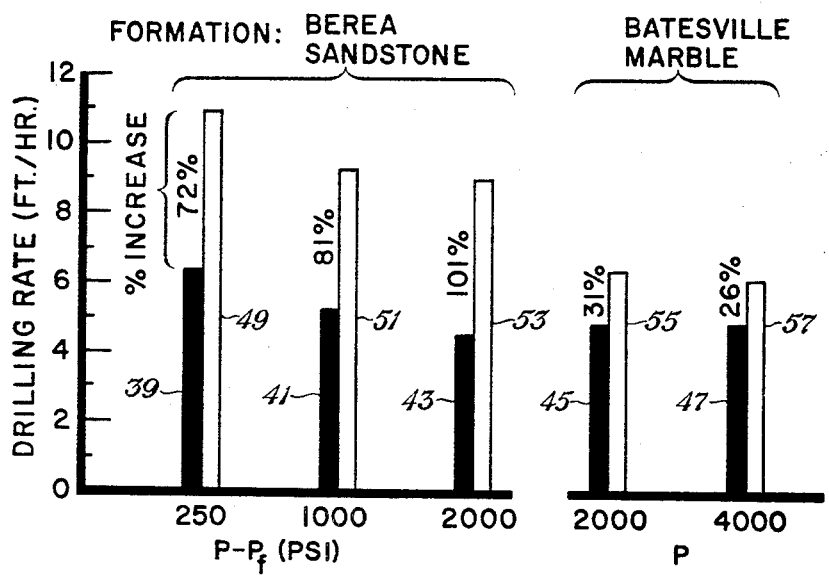
FIGURE 3 graphically illustrates the improved drilling rates in Berea sandstone and Batesville marble obtained by use of the invention when compared with conventional rotary methods.

The method of the present invention is schematically illustrated in FIGURE 2, where a drill bit 11 having a central passage 13 is shown emitting a stream of drilling mud or the like with a velocity V. The drilling mud aids the teeth 15 in moving the cuttings 17 off the borehole bottom 19. Drill bit 11 is rotated in the usual manner while loaded by the usual drill string members (not shown) so that a gravitational force W acts to drive bit 11 into bottom 19. Elastic vibrations are generated directly in the drilling mud (i.e., in the cavity surrounding the drill bit and having as one of its bounding surfaces the exterior of the bit) by some means, which in this instance is illustrated schematically as a reciprocating piston 21.

For the sake of clarity it is best to keep in mind the distinction between the method of the present invention and the method of the prior art vibratory devices. Such devices are illustrated schematically in FIGURE 1 where it may be seen that a bit 11 is vibrated by the percussive action of a falling hammer 23. The percussive force $F_p$ coupled with the gravitational force W forms cuttings 17 on borehole bottom 19 through the action of teeth 15.

In view of the above description it may be seen that the present invention is directed to the concept of generating elastic vibrations directly in the drilling fluid surrounding the drill bit. On the other hand prior art vibratory devices are directed to the concept of generating elastic vibrations directly in the drill string or drill bit. The consequence of directly vibrating the bit is the creation of bottom hole pressure variations which are in phase with the vibrations of the bit load. The bottom hole pressure increases just at the instant the bit strikes downwardly, creating an impediment to the downward progress of the bit.

The detrimental aspects of the prior art method and the beneficial aspect of the present invention will be more apparent by reviewing four of the more important factors that affect the drilling rate of a drill bit. FIGURE 1–A shows, for example, the effect on the drilling rate of varying the net bit load L. As is evident from the curve, drilling rate increases linearly with the weight applied to the bit.

FIGURE 1–B shows for a permeable rock the relationship between drilling rate and the pressure differential $(P-P_f)$ between the borehole fluid and the fluid in the interconnected ports of the formation. As may be seen from FIGURE 1–B, drilling rate decreases with increases in pressure differential.

Such decreases in penetration rate with increases in pressure differential are primarily a result of improper cleaning of the bottom of the hole. A relatively recent theory advanced to explain the decrease in drilling rate of a permeable rock that accompanies an increase in the pressure differential $(P-P_f)$ was advanced by R. A. Cunningham and J. G. Eenink in a published technical paper entitled, "Laboratory Study of Effect of Overburden, Formation and Mud Column Pressures on Drilling Rate of Permeable Formations," Trans., AIME (1959) 217.9. This paper presented test results and explanations supporting their theory that a layer of mud particles called "filter cake" is formed on the wall and bottom of the hole and traps cuttings on the bottom of the hole, the filter cake being analogous to a slip casting formed in a porous mold as water is absorbed by the mold. Referring to FIGURE 1 for illustration of this point, note that the numeral 25 designates the filter cake that covers all the hole, including the bottom 19. Chips or cuttings 17 from the formation are created by the teeth 15 and normally are washed toward the surface by the circulating fluid. If the pressure differential becomes large enough, the filter cake 25 becomes thick and tightly compressed so that a substantial force is required to dislodge chips 17 from borehole bottom 19. Hence the bit 11 inefficiently regrinds the chips 17 instead of penetrating virgin formation, and the drilling rate is drastically reduced.

FIGURE 1-C shows for an impermeable rock the effect on drilling rate of varying fluid column pressure. As may be seen from FIGURE 1-C, drilling rate decreases with increases in fluid column (bottom hole) pressure. This decreases in drilling rate is primarily a result of two factors: (1) the greater force on a drill bit tooth required to remove the same volume of rock at a higher pressure, and (2) improper cleaning of the bottom of the hole.

Under high fluid column pressures, the rock at the bottom of the hole is subjected to a high hydrostatic compressive stress. Although rocks are very weak in tension, the possibility of the drill bit tooth creating a tensile failure in the rock is reduced by an increase in hydrostatic stress. Under such circumstances, greater tooth loadings are required to remove the same volume of rock than at lower pressure heads. While this is an oversimplification of the effect of hydrostatic pressure on rock failure mechanism, it is sufficient to understand the general effect of increasing fluid column pressure.

The improper cleaning phenomenon previously discussed for permeable rock is substantially true even for impermeable rock, since the formation of chips by the bit creates a pseudo-permeability and the same chip holddown forces exist.

FIGURE 1-D shows the effect on drilling rate of varying the jet velocity (V) of the drilling fluid issuing from the nozzles of the bit. The increase in drilling rate with increased jet velocity is a result of improved cleaning of the bottom of the hole. The higher jet velocities enable the fluid stream to more easily penetrate the filter cake and to dislodge more of the free cuttings on bottom.

As stated previously, the present invention relates to the concept and subsequent substantiating discovery that cyclic variations of the fluid column pressure above and below its average value causes substantial increases in the drilling rate of a rock bit. FIGURE 2-A illustrates by curve 27 variations of a sinusoidal nature in the drilling fluid pressure P at the bottom of the hole. The dotted horizontal line 29 represents the average fluid column pressure and also represents the pressure time relationship in the absence of the present invention. Curve 31 shows the resulting excursions in net bit load L, also varying about an average value indicated by the horizontal line 33. Curve 35 shows the cyclic variations in jet velocity from an average value indicated by the horizontal line 37. Notice that curve 35 is in this instance sinusoidal in nature and is one hundred eighty degrees out of phase with the cyclic variations in fluid column pressure (curve 27) but in phase with the cyclic variations in the bit load (curve 31).

To understand how a variation in fluid column pressure may substantially increase the drilling rate of a rock bit, consider the condition existing at the bottom of the hole when the fluid column pressure is at its minimal value, for example, at one of the points $P_{min}$ indicated in FIGURE 2-A. At this instant, the bottom hole pressure is reduced below its average value, the pressure differential across the filter cake is greatly reduced, the jet velocity as shown by curve 35 is appreciably increased and the load on bit is greatly increased, as indicated by curve 31.

All these factors work in cooperation to greatly increase the drilling rate during the time that the fluid column pressure is reduced. It is common practice in the drilling of oil wells to maintain from 500–1000 p.s.i. greater pressure within the borehole than exists in the pores of the formation being drilled. If the amplitude $P_e$ of the pressure variation indicated by curve 27 of FIGURE 2-A is approximately 1000 p.s.i., then as pressure P passes through its minimal value $P_{min}$ the pressure differential $(P-P_f)$ across the filter cake will be either zero or negative. Obviously, this will cause a very large increase in the instantaneous drilling rate. The aforesaid is true since the time duration for a fracture to occur in the rock beneath a rock bit tooth or for a rock chip to be dislodged from bottom by the jet stream is relatively short compared to the time duration of the negative portion of the fluid pressure fluctuation at all feasible frequencies of the present invention. In addition, the time that a given rock bit tooth is in contact with the bottom of the hole is extremely long with respect to the time for a rock failure to occur and is several times longer than the period for a complete mud column pressure variation cycle. Thus, each time a rock bit tooth contacts the bottom of the hole several mud column pressure cycles occur and there are several favorable opportunities for rock fracture to occur.

When the fluid column pressure is at its minimal $P_{min}$, the hydraulic forces exerted on the lower end of the bit are reduced below the average value, and this increases the load exerted by the bit and drill string on the formation. At the same time the hydraulic pressure drop existing across the jet nozzles is increased, resulting in increased jet velocities at the same time that the pressure differential $(P-P_f)$ is zero or negative. At such times the filter cake is easily penetrated by the fluid stream and the cuttings are easily carried away.

From the foregoing, it is apparent that when the fluid column pressure is a minimum, the pressure differential $P-P_f$ is a minimum, the force exerted by the bit on the formation is a maximum, and the jet velocity is a maximum. All of these factors working in the proper phase relationship in combination with the relative durations of tooth contact time, pressure variation cycle time, rock ship dislodgement time, and rock fracture time, enable the present invention to effect a substantial increase in drilling rate. Surprisingly, the increases in drilling rate during negative excursions of the hydrostatic pressure to minimum pressures $P_{min}$ are not offset by decreases in drilling rate during positive excursions to maximum pressures $P_{max}$, and the drilling rate approaches that which would be obtained by statically reducing the bottom hole pressure to a value equal to that indicated by the point $P_{min}$ in the FIGURE 2-A.

Specific examples of the increases over the conventional rotary drilling method by use of the invention are presented in the bar graphs of FIGURE 3. The black bars therein, numbered from 39 to 47, represent the drilling rates achieved by bits using the conventional rotary method of the prior art, wherein there are no forced vibrations coupled directly to the mud column without first passing through the drill string and drill bit. The white bars, having numerals from 49 to 57, show the vastly improved penetration rates achieved with identical bits run under identical conditions. The only differences are the application of elastic vibrations to the drilling fluid around the bits which achieved the penetration rates represented by the white bars.

Such results were obtained with laboratory tests under controlled conditions that closely simulated actual drilling conditions. The bit size was 1¼ inches and other conditions such as weight on the bit, rotary speed, etc., are shown on the graph of FIGURE 3.

This graph is self-explanatory, except perhaps the abscissa designation $P-P_f$. As the legend indicates P is the bottom hole or mud column pressure while $P_f$ is the formation pressure, i.e., the hydrostatic pressure of fluids in the formation at the bottom of the hole. The drilling rate is actually a function of this pressure differential rather than the bottom hole pressure alone. If, for example, the formation pressure $P_f$ is equal to the bottom hole pressure P (even though P might have a very large value), then the formation normally is drilled quite fast. On the other hand, if the formation pressure $P_f$ is small and the bottom hole pressure P is large, the formation normally is drilled quite slowly.

It is the pressure differential $P-P_f$ that is critical in drilling permeable formation like sandstone and, for this reason it is used as the abscissa on the graph for the drilling rates in Berea sandstone of FIGURE 3.

Of interest is the greater increase in drilling rate achieved by the invention in permeable Berea sandstone when compared to the increase in the practically impermeable Batesville marble. This difference is due to the well known but little understood fact that the effect on drilling rate of reducing the bottom hole pressure is not as great for an impermeable rock as it is for a very permeable one. Those in the art are familiar with the phenomenon even though many disagree in explaining it. Neverthless, bars 45, 47 and 55, 57 of FIGURE 3 demonstrate that even in impermeable rock, impressive increases in drilling rates are achieved with the invention.

In view of the above description, it will be appreciated that the invention in its broadest sense is a method of drilling which can be practiced independently of any specific apparatus. There are a number of elastic vibration generator apparatuses that may be used to create pressure variations in the fluid which surrounds the bit. The apparatus of FIGURE 2 suitably demonstrates the broad concept and, in fact, is representative of that used in the laboratory tests from which the data of FIGURE 3 were obtained. Such apparatus, however, is somewhat impractical as an apparatus that can be used in the drilling of the deep wells often necessary for the production of oil and gas.

Figure 4:
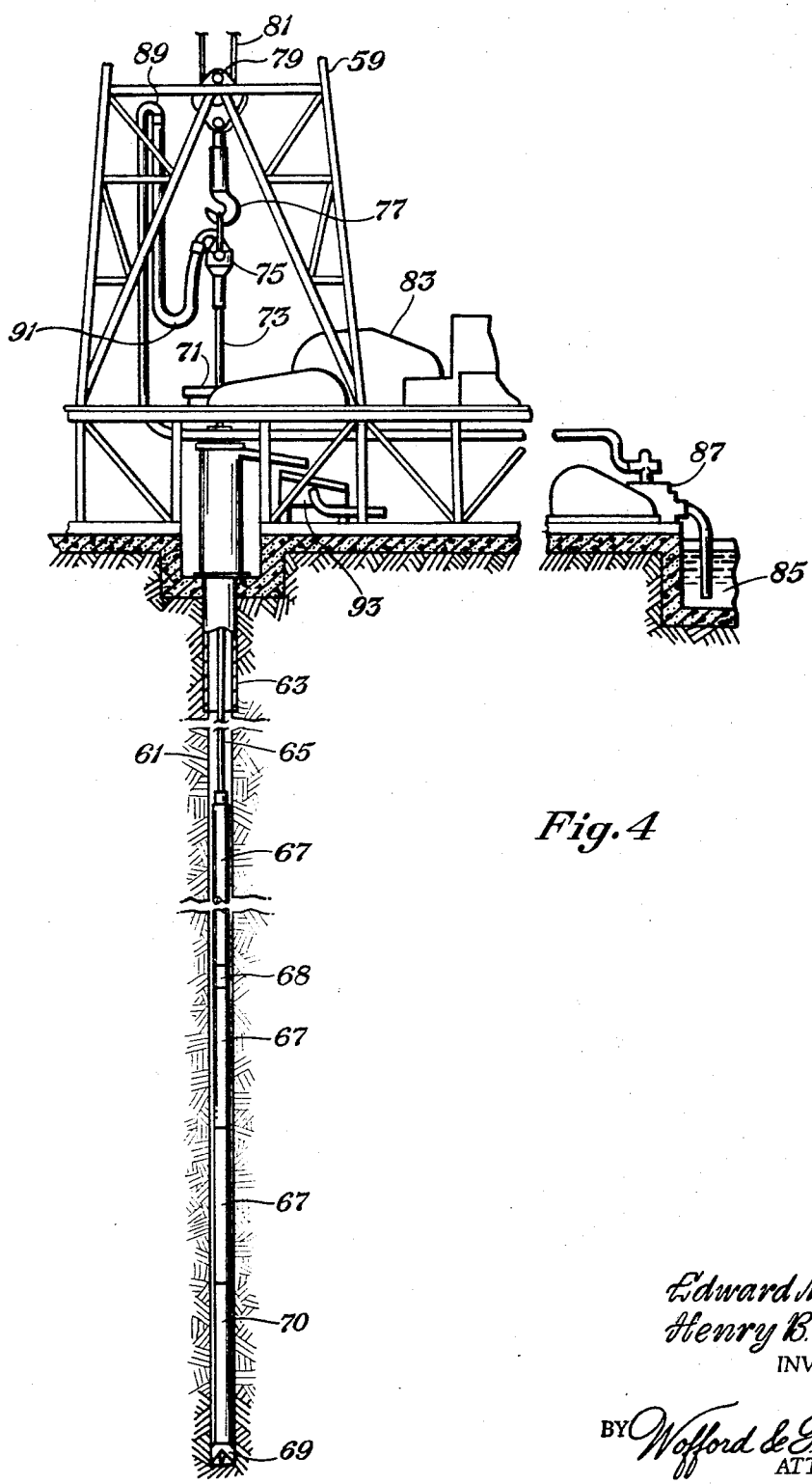
FIGURE 4 illustrates a conventional rotary drilling rig and a preferred location of the elastic vibration generator of the present invention.
Figure 8:
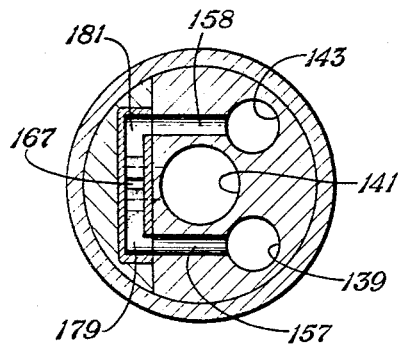
FIGURE 8 is a cross sectional view as seen looking along the lines VIII—VIII of FIGURE 6.

*Description of the apparatus of FIGURE 4*

FIGURE 4 illustrates a conventional rotary drilling rig which utilizes the method of the present invention. The numeral 59 designates a derrick located over a borehole 61 that contains surface casing 63, drill pipe 65, drill collars 67 and drill bit 69. The elastic vibration generator 70 is connected in the drill string directly above the bit.

Rotation of the bit 69 is achieved by the engagement of a rotary table 71 with a kelly 73, which is the uppermost tubular member of the drill string. The kelly 73 is attached to a swivel 75 this is supported in the derrick 59 by hook 77, traveling block 79 and cable 81. The cable 81 is attached through pulleys at the top of the derrick (not shown) to the draw works 83, which lifts and lowers the drill string.

The fluid circulatory system consists of a sump 85 from which drilling mud is drawn by means of a mud pump 87. The mud travels to standpipe 89 in derrick 59, through mud hose 91, down kelly 73, and ultimately to drill bit 69. Cuttings from the bottom of the hole are washed by the mud up through borehole 61 and outside of the drill string, and are then separated from the mud by a shale shaker 93. The mud then returns to sump 85 where the circulatory process is repeated.

The vibration generator 70, attached to the drill collars 67 above the bit 69, is a device that creates pressure variations in the mud at the bottom of the hole around the drill bit. This device is preferably activated by the circulating drilling fluid, and thus does not require an additional external power source as does the apparatus of the FIGURE 2 illustration.

*Description of the apparatus of FIGURES 5 through 8*

In FIGURES 5 through 8 is shown an advantageous apparatus which is an elastic vibration generator, which may be referred to as a "pure fluid" or "fluidic" generator device in that it has no moving mechanical components. This device also has a coupling component which couples the elastic vibration generator with the drilling fluid surrounding the drill bit and the bit nozzles. The coupling devive B also has no moving mechanical components. The elastic vibration generator is designated by the letter A, the coupling device is designated by the letter B and a pair of Helmholtz resonators are designated by the letters C and D.

The upper portion 111 (see FIGURE 5–B) of the apparatus is threaded for connection to a drill string member and is formed of a tubular member 112 that has a cavity 113 therein partially formed by an inner sleeve 114. The lower region 115 of tubular member 112 is threaded for connection to another drill collar or sub 117. A plurality of apertures 119 communicate with an axially extending bore 121 and with the cavity 113. The cavity 113 and the apertures 119 constitute a Helmholtz resonator C, the purpose of which will be described in the operational description.

An intermediate portion 123 of the apparatus is threaded at an upper end 125 for connection to the drill collar or sub 117. The intermediate member has an annular internal cavity 126. The lower end 127 of the intermediate member is threaded for connection to a sub 129 which has a plurality of apertures 131 that extend from the cavity 126 to the exterior of the apparatus. Thus, the intermediate portion 123 and the specially adapted sub 129 constitute another Helmholtz resonator D, the purpose of which will be explained in the operational description. The lower portion 133 (see FIGURE 5–A) of the apparatus has its upper end 135 adapted for connection to the sub 129 and receives the elastic vibration generator A and a coupling component 137 of coupling device B.

Referring now to FIGURE 6, the elastic vibration generator A in this particular instance has a body portion 139 that is formed of an originally solid cylindrical metal component. A central axially extending bore 141 is formed in the center of the body portion to communicate with the bore 121 previously mentioned. Two other axially extending bores 143 and 145 extend partially through the body portion with their lower ends 147, 149 terminating above the lower end 151 of the body portion as shown. The upper ends of the bores receive plugs 153, 155. Thus, two cavities are formed inside the body portion 139.

Each of the axial bores 143, 145 communicates with a pair of apertures 157, 159 or 158, 160 which together with their respective axial bore or cavity 143, 145 constitute a feedback channel to control the frequency of the fluidic oscillator unit 161. The fluidic oscillator unit 161 shown in FIGURES 6 and 7 is a high gain, bistable, fluidic amplifier with positive feedback to cause oscillation of the bistable unit. Such devices are described in "The Proceedings of the Fluid Amplification Symposium," Harry Diamond Laboratories, October 1965, Volume III, distributed by the Clearinghouse for Federal, Scientific, and Technical Information, Department of Commerce, see pages 131–159.

The fluid is supplied to the fluidic oscillator 161 from the central axial passage 141 and through a radially extending supply port 163 which is formed in the body 165 (see FIGURES 6 and 7) of the device and through the body portion 139. Supply port 163 communicates with a power nozzle 167 via a tapered passageway 169. A pair of control nozzles 171, 173 are transversely aligned to oppose each other immediately downstream from the power nozzle 167. These control nozzles communicate via tapered passages 175, 177 with control ports 179, 181. The control ports 179, 181 are aligned with the feedback apertures 157, 158 as shown in FIGURE 6. Axially aligned with the power nozzle 167 and communicating with the control nozzles 171, 173 is an interaction region 183. This downwardly diverging interaction region communicates with two receiver channels 185, 187. The receiver channels 185, 187 each communicate with feedback channels 193, 195 and with diffuser channels 189, 191 that are on respective sides of a splitter 192. The feedback channels 193, 195 are connected with feedback ports 197, 199 which in turn communicate respectively with the apertures 159, 160 shown in FIGURE 6. The diffuser channels 189, 191 diverge and extend through the body 165 into communication with outlets 201, 203 (see FIGURE 6) in the lower region of the body portion 139.

The fluid oscillator above should be designed to be sensitive to the acoustical load imposed on it so that it will oscillate at the resonant frequency of the system over a wide range of supply pressures.

The elastic vibrations produced in the fluidic oscillator unit 161 are transmitted to the drilling fluid surrounding the drill bit downstream from the bit nozzle with the assistance of the coupling device B, which has the previously mentioned coupling component or insert 137 that has a radially extending flange 205 and an axial bore 207 extending therethrough. As may be seen in FIGURES 6 and FIGURE 5-A, an annular cavity 209 is formed between the flange 205 and the radially extending shoulder 211 of the lower portion 133 of the apparatus. Two apertures 213, 215 extend axially through flange 205, and alignment means such as dowel 206 on insert 137 and aperture 208 on the body portion 139 of the fluidic oscillator may be used to align apertures 213, 215 with outlets 201, 203. Aperture 213 communicates with a tube 217 that extends through cavity 209 and communicates with an aperture 219 which extends through the lowermost region 221 of lower portion 133 to the exterior cavity 222 which surrounds the drill bit 224. Aperture 215 communicates with another tube 223 (see FIGURE 6) which extends a selected distance into the cavity 209. Another aperture 225 extends through the lower region 221 of lower member 133 to provide a passageway between internal cavity 209, nozzle means 226 in the drill bit 224, and the cavity 222 surrounding the drill bit 224. In the above apparatus various seal means such as O-ring 226 may be used between the various components to prevent fluid flow except through the selected passages and cavities.

One of the requisites of a desirable coupling device is that it possess a high Q. The Q of a system is sometimes defined as $2\pi$ times the maximum stored energy divided by the energy dissipated per cycle. In effect a high Q system provides the equivalent of fly wheel action in a mechanical system. It is desirable to have a high Q system to insure stability of operation of the entire system; and to insure that the fluidic oscillator operates at the design frequency of the system over a wide range of supply pressures. The coupling device of FIGURES 5-A and 6 may be effectively used to provide a high Q.

For most satisfactory operation of the above and related apparatus, the impedance of the bit nozzle should match the impedance of the acoustic circuit. Some experimentation has been necessary for proper matching of these impedances because it is difficult to accurately calculate oscillator impedances. Specific examples of successfully used element values will be given hereinafter.

*Operational description of the apparatus of FIGURES 5 through 8*

In operation, the apparatus is inserted in a drill string above a drill bit and lowered into a well bore which defines with the apparatus and the other drill string members an annulus for the return of drilling fluid to the surface. The axial bore 121 extending through the apparatus and which includes the axial bore 141 of the elastic vibration generator and the axial bore 207 of the coupling component 137 provides a passageway for the flow of drilling fluid from a mud pump 87 (see FIGURE 4) at the surface of the well to the nozzles of the drill bit. As in conventional rotary well drilling, the drilling fluid flows through the axial bore 121, through the bit nozzles and flushes cuttings from the bottom of the bore hole and carries them to the surface.

A portion of the fluid flowing through the axial bore 141 of the elastic vibration generator is diverted through supply port or input passage 163 into the fluidic oscillator unit 161. A high velocity jet stream flows from power nozzle 167 and alternately flows into receiver channels 185 and 187. This alternating flow results from the positive feedback effected by feedback channels 193, 195 (see FIGURE 7); apertures 159, 160 (FIGURE 6); cavities formed in the axial bores 143, 145; apertures 157, 158; control ports 179, 181; and control nozzles 171, 173. The jet stream issuing from power nozzle 167 entrains adjacent fluid in the interaction region 183 and tends to lower the pressure in this region. The jet stream strikes the splitter 192 (see FIGURE 7) and due to tubulence, more of it passes on one side of the splitter than the other, for example, through receiver channel 187. Due to the proximity of interaction region wall 194, said wall will impede the entrainment of fluid to the stream, and the stream will be more effective in lowering the pressure in the vicinity of interaction region wall 194 than it will the opposite interaction region wall 196. Due to the resulting differential pressure across the jet stream in the interaction region, the jet stream fluid will move closer to wall 194, thus further reducing the pressure near wall 194 and increasing the differential pressure across the jet stream issuing from the power nozzle 167. This action produces wall "lock-on" which is regenerative to the extent that essentially all of the fluid flowing from the power nozzle 167 will flow into receiver channel 187. A portion of the fluid entering receiver channel 187 will flow into feedback channel 195 and subsequently return via the feedback loop to control nozzle 173. When the flow in the control nozzle 173 reaches a certain level, the jet stream issuing from the power nozzle 167 and flowing into receiver channel 187 will switch to and lock onto wall 196 of the interaction region 183. In like manner a portion of the fluid entering receiver channel 185 will flow into feedback channel 193 and return via its respective feedback loop to control nozzle 171. When the flow in control nozzle 171 reaches a certain level, the jet stream will be switched back and locked to interaction region wall 194, thereby completing a cycle. Thus oscillation is produced and the period of time between the beginning of flow in the feedback channel 193 or 195 until the flow in the control jet 171 or 173 reaches its switching level is established by the geometry of the feedback loop.

The feedback loop may have various geometries, some of which are discussed in "The Proceedings of the Fluid Amplification Symposium," Harry Diamond Laboratories, previously mentioned. During each half cycle of oscillation, a majority of the fluid entering receiver channels 185 or 187 flows into either diffuser channel 189 or 191 and to the outlet 201 or 203 of body portion 139 of the elastic vibration generator A. As previously mentioned, the outlets 201, 203 communicate with the apertures 213, 215 of the coupling device B. Coupling device B is also a "pure fluid" or "fluidic" device.

In operation of the fluidic coupling device B of FIGURES 5-A and 6, the output of the fluidic oscillator unit 161 is coupled to the fluid in the cavity surrounding the bit and downstream from the bit nozzles by means of proper acoustical circuitry that accomplishes three objectives: (1) proper matching of the output impedance of the fluidic oscillator 161 with the dissipative load imposed by the bit nozzles, (2) effective phase inversion of the elastic vibrations in one of the output legs of the fluidic oscillator 161, and (3) the provision of a high Q system.

The output of diffuser channel 191 feeds aperture 213, tube 217 and aperture 219, which together with the fluid therein constitute an acoustic inertance. Aperture 219 communicates with the fluid in the cavity 222 surrounding the bit, the cavity 222 being in effect an acoustic compliance. The output of diffuser channel 189 feeds aperture 215, and tube 223 which constitute another acoustic inertance. Tube 223 terminates within annular cavity 209 which constitutes another acoustic compliance. Aperture 225 is an acoustic inertance communicating between annular cavity 209 and the cavity 222 surrounding the drill bit. By proper dimensioning of all of the acoustical elements within the acoustical coupling circuitry, the previously mentioned three objectives can be accomplished. Hence, the output vibrations of the elastic vibration generator are placed in the proper phase relationship to enable effective utilization of the above-described method.

To prevent large power dissipation up the annulus, the Helmholtz resonator D is used as a side branch with inlets at a point one quarter wavelength above the uppermost extremity of the bit cavity 222. This effectively causes the acoustical impedance looking up the annulus to be very high, thus preventing any appreciable loss of acoustical power up the annulus. The Helmholtz resonator D is formed by the acoustical inertance of apertures 131 and the acoustic compliance of annular cavity 126. The physical dimensions of these components must be properly adjusted for resonance at the operating frequency.

The apertures 119 and the cavity 113 constitute another Helmholtz resonator C which is used as a side branch in the axial bore 121 and the entrance to apertures 119 is one half wavelength above the bit nozzles. This effectively maintains the pressure upstream of the bit nozzle constant despite large variations in fluid flow through the nozzles. The Helmholtz resonator C is also tuned to the operating frequency of the fluidic oscillator.

In FIGURE 4 is shown a shock absorber 68 which may be of the type disclosed in the application of Edward M. Galle, Ser. No. 537,920, filed Mar. 28, 1966. A shock absorber is preferably inserted in the drill string one half wavelength above the drill bit, the wavelength being that of the elastic vibration in the drill string at the operating frequency. Thus, the shock absorber is positioned at a displacement antinode to make the impedance at the bit looking into the drill collars very low to enable the bit to be pulled into the formation by the cyclic reduction in pressure in the fluid volume in the cavity 222 surrounding the bit. If a shock absorber is not used and if the drill string members are quite rigid, cyclic variations in bit load will be reduced, but improvements in drilling rate will still obtain from the cyclic decreased in pressure and increases in jet velocity.

*Manufacturing data for the apparatus of FIGURES 5 through 8*

An example of specific dimensions or formulas that may be used in the manufacture of the apparatus of FIGURES 5 through 8 which may be used in 7⅞ inch diameter bore holes and which is designed to operate at about 100 cycles per second is as follows:

In the elastic vibration generator A, 80 gallons per minute of drilling fluid was supplied through supply port 163 at a pressure of 1800 p.s.i. relative to the average bottom hole pressure. The power nozzle 167 of the fluidic oscillator unit 161 had a width of .120 inch and a depth of .400 inch, giving a depth to width aspect ratio of 3.33. (The various passages in the fluidic oscillator unit are square or rectangular in cross section unless otherwise indicated.) The splitter 192 was positioned 12.5 nozzle widths downstream from the exit of power nozzle 167. The control nozzles 171, 173 had a width of .100 inch and a depth of .400 inch. The interaction region walls 194, 196 and the splitter 192 had included angles of 15°. The setback distance $a$ was .045 inch and the entrances to the diffuser channels 189, 191 had widths of .200 inch and depths of .400 inch. The diffuser channels had a length of constant width section of six entrance widths as shown in FIGURE 7 to smooth the flow before entering into the divergent diffuser regions, each of which had an included angle of 10°. Supply port 163 had a diameter of one inch and control ports 179, 181 and feedback ports 197, 199 had diameters of 5/16 inch. Central axial passage 141 of body portion 139 of the elastic vibration generator A may have a diameter of two inches. The apertures 157, 159, 158 and 160 of the feedback loops had diameters of 5/16 inch and lengths of 2.0 inches. The diameters and lengths of the cavities defined by the axial bores 143, 145 and the plugs 153, 155 may be varied to control the operating frequency of the fluidic oscillator unit. For operating at a frequency of 100 cycles per second, the diameter of the axial bores 143, 145 was 1½ inches; and the depths of the cavities defined by the bores and the plugs 153, 155 was 9 inches.

Manufacturing data for coupling device B will be specified by giving the acoustical element values which are used to couple the elastic vibration generator A to the drilling fluid in the cavity surrounding the bit, rather than by giving physical dimensions of the various passages and chambers. The physical dimensions of the passageways and volumes of the acoustical elements may be calculated by the following formulas:

(1) The formula for acoustical inertance is as follows:

$$M = \rho_0 l / S$$

where:

$\rho_0$ = mass density, slugs/ft.$^3$
$l$ = length of passageway, ft.
$S$ = cross sectional area of passageway, ft.$^2$ (2) The acoustical compliance is computed in accordance with the formula:

$$C = V / \rho_0 c^2$$

where:

$V$ = volume of fluid in cavity, ft.$^3$
$\rho_0$ = mass density, slugs/ft.$^3$
$c$ = speed of sound in fluid, ft./sec.

When the walls of a cavity are not very rigid with respect to the compressibility of the fluid in the cavity, then the elasticity of the walls must be taken into account.

The inertance value of the combined outlet 203, aperture 213, tube 217 and aperture 219 was 440 lbs. sec.$^2$/ft.$^5$ and the inertance of the combined outlet 201, aperture 215 and tube 223 was 495 lbs. sec.$^2$/ft.$^5$. The compliance of annular cavity 209 was $1.128 \times 10^{-8}$ ft.$^5$/lb. The compliance of the drilling fluid in a typical cavity 222 surrounding a 7⅞ inch diameter bit is $.928 \times 10^{-8}$ ft.$^5$/lb. The inductance of the aperture 225 which extends from cavity 209 to the bit cavity 222 was 569 lbs. sec.$^2$/ft.$^5$.

As previously mentioned, the impedance looking up the annulus from the bit cavity is preferably made high by the use of a resonator such as the Helmholtz resonator D. The mouth of the aperture 131 of this resonator was located ¼ wave length (12½ feet) from the lowermost end of the annulus (i.e., from the upper portion of the cavity 222 surrounding the bit). In general the wave velocity of propagation in the annulus of a bore hole will be somewhat less than the velocity of sound in the fluid filling the annulus due to the elasticity of the walls of the bore hole and/or the tool in the hole. Thus when calculating a quarter wave length in the annulus, these effects must be taken into account. A quarter wave length in feet in the annulus may be calculated as follows:

$$\frac{\lambda}{4} = \frac{1}{4f} \sqrt{\frac{1}{\frac{1}{C^2} + \frac{\rho_0 \pi (1+\mu) D^2}{2ES}}}$$

where:

$f$ = frequency, cycles per second
$c$ = speed of sound in fluid, ft./sec.
$\rho_0$ = mass density, slugs/ft.$^3$
$D$ = diameter of bore hole, ft.
$\mu$ = Poisson's ratio for formation being drilled
$E$ = modulus of elasticity of the formation, #/ft.$^2$
$S$ = cross sectional area of the annulus, ft.$^2$ The inertance of apertures 131 (10 uniformly spaced apertures are formed around the circumference in the preferred example) was 120 lb. sec.$^2$/ft.$^5$ and the compliance of cavity 126 was $2.1 \times 10^{-8}$ ft.$^5$/lb. The Helmholtz resonator C associated with the fluid flowing into the axial bore 121 of the apparatus has one or more apertures 119 that have a combined inertance of 120 lb. sec.$^2$/ft.$^5$. The entrances of apertures 119 was located ½ wave length (25 feet) from the bit nozzles. The compliance of cavity 113 was $2.1 \times 10^{-8}$ ft.$^5$/lb.

The impedance of the bit nozzles was $.9 \times 10^6$ lb. sec./ft.$^5$, which is typical of the impedance of normal bit nozzles used in 7⅞ inch bore holes. The impedance of drill bit nozzles may be calculated by the following formula:

$$\text{Impedance} = 2P/Q$$

where:

$P$ = average pressure drop across nozzle, lbs./ft.$^2$
$Q$ = average flow rate through nozzle, ft.$^3$/sec.

The fluidic oscillator unit 161 was manufactured of tungsten carbide to increase wear resistance, but it should be understood that there are a variety of materials that may be used in making this and other components of the invention and that the invention is not limited to the use of any particular materials.

Figure 9:
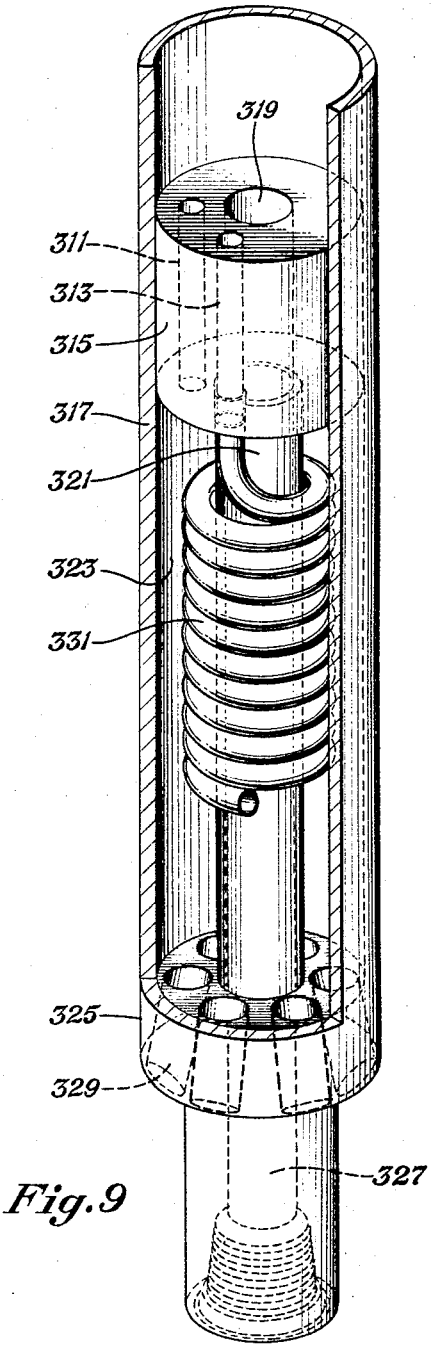
FIGURE 9 is a perspective view of an alternate form of coupling device, with a portion thereof broken away to expose its interior.

Description of the apparatus of FIGURE 9

The fluidic coupling device of FIGURE 9 utilizes an L network for impedance matching with a half wave length delay line. The fluidic oscillator used in combination with this coupling device may be of the same type shown in FIGURES 5 through 8.

The output ports of the oscillator communicate with apertures 311, 313 of a flange 315 that is assembled within the upper end of a tubular housing 317 of the fluidic coupling device. A central fluid passageway 319 extends axially through flange 315 and is partially formed by a tube 321 that extends through a cavity 323 inside the device. A lower flange 325 has a central fluid passageway 327 that communicates with the tube 321 and extends to the drill bit (not shown). The lower flange has a plurality of large apertures 329 which extend from the cavity 323 to the cavity surrounding the drill bit.

The aperture 311 communicates directly with cavity 323, while aperture 313 communicates with a helical tube 331 which forms a delay line that also communicates with the cavity 323. The helical tube 331 from the lowermost surface of the flange 315 to its outlet is one half the wave length long measured at the operating frequency of the fluidic oscillator.

Operation of the apparatus of FIG. 9

In operation of the fluid coupling device of FIGURE 9, the elastic vibrations in the drilling fluid of one diffuser channel of the oscillator travel into cavity 323 via aperture 311. The inertance of parallel apertures 311 and 313 along with the combined compliance of cavities 323 and the cavity surrounding the bit (not shown) are adjusted such that the impedance of the bit nozzles is matched to the output impedance of the elastic vibration generator. Aperture 313 has the same dimensions and therefore the same inertance as aperture 311. Tube 331, being one half wave length long, acts as a phase inverter such that the flow of fluid into cavity 323 via aperture 311 and via the output end of the half wave length tube 331 is in phase. With this arrangement, 180 degree phase inversion of both the pressure and the flow occur in one leg. This results in a combined oscillator delay line output impedance of ¼ that of the oscillator alone. The characteristic impedance of the one half wave length delay line 323 should be such that extremely high pressures do not exist in the line or that excessive fractional losses do not occur. If extremely high pressures exist, then excessively thick tube walls will be required.

Manufacturing data for the apparatus of FIGURE 9

An example of element values that may be used in making the coupling device of FIGURE 9 is as follows:

The combined inertance of aperture 311 of flange 315 along with its associated diffuser channel of the oscillator was $1.81 \times 10^3$ lb. sec.$^2$/ft.$^5$. The inertance of the aperture 313 and its associated diffuser channel was the same. The length of the delay line or tube 331 as measured along its central axis was 25 feet, this length being one half the wave length of a 100 cycle per second sound wave in the drilling fluid. The combined compliance of cavity 323 and the cavity surrounding the bit was $.420 \times 10^{-8}$ ft.$^5$/lb. As previously explained, the apertures 329 that extend through the lower flange 325 were large enough and numerous enough such that they may be considered to have essentially no inertance. The impedance of the drill bit nozzles for the coupling device specified was $1.845 \times 10^6$ lb. sec./ft.$^5$ and the real component of the output impedance of the fluidic oscillator with the one half wave length delay line in one leg was $.25 \times 10^6$ lbs. sec./ft.$^5$. The value given for the load impedance of the drill bit nozzles is typical for drilling operations where high pressure mud pumps (by contemporary standards) are available. The acoustical coupling device, along with its one half wave length phase inversion line, is useful for coupling fluidic oscillators to the drilling fluid in the cavity around the bit when the oscillators with a one half wave length delay line in one leg have output impedances lower than the load impedance imposed by the drill bit nozzles. If this coupling device is used to couple fluidic oscillators with a one half wave length delay line in one leg and which have higher output impedances than the load impedance of the bit nozzles, reduced efficiency will result. When the output impedance of the fluidic oscillator and delay line is only slightly lower than the impedance of the drill bit nozzles, physical sizing of the acoustical elements may become difficult when operating at 100 cycles per second. In such cases it may be advantageous to change the operating frequency of the oscillator such that the sizing difficulty will be minimized. In the event no compromise can be obtained between physical sizing and operating frequency, then it will be advantageous to utilize such coupling devices as outlined in connection with the description of FIGURES 5 through 8. In the coupling device of FIGURE 9 there are insufficient degrees of freedom to match the output impedance of the fluidic oscillator and delay line to the load impedance and simultaneously fix the Q of the system. However, due to the existance of a Helmholtz resonator communicating with the fluid in the annulus and another communicating with the fluid in the axial bore of the tool, sufficient degrees of freedom may be available to fix the Q of the entire system at a desirable level.

If physical sizing of the components of the coupling device shown in FIGURE 9 becomes a problem, or if it is desirable to have a high Q coupling device while properly matching impedances, slight alteration of the structure of FIGURE 9 may be made to accomplish this. For example, apertures 329 may be sized such that they offer significant inertance, which will convert the coupler to what may be called a $\pi$ impedance matching network. By placing significant inertance between cavity 323 and the fluid which surrounds the drill bit, these two cavities are effectively separated and thus each must be considered as a separate compliance. With a $\pi$ network arrangement, sizing difficulties are greatly reduced and the Q of the coupling device may be established independently of the ratio of the load impedance to oscillator impedance.

Examples of acoustical element values that may be used with the above described $\pi$ network modification of the FIGURE 9 coupling device are as follows:

The inertance of aperture 311 and its associated diffuser channel may be 625 lb. sec.$^2$/ft.$^5$. Similarly, the inertance of aperture 313 and its associated diffuser channel will be 625 lb. sec.$^2$/ft.$^5$. The length of phase inverted tube 331 will be 25 feet and the compliance of cavity 323 will be $1.253 \times 10^{-8}$ ft.$^5$/lbs. The inertance of apertures 329 will be 473 lb. sec.$^2$/ft.$^5$ and the compliance of the drilling fluid surrounding the bit will be $.928 \times 10^{-8}$ ft.$^5$/lbs. These acoustical element values given are for a load impedance of $.9 \times 10^6$ lbs. sec./ft.$^5$ and an oscillator output impedance (real component) of $.5 \times 10^6$ lbs. sec./ft.$^5$.

*Description of the apparatus of FIGURES 10 through 13*

FIGURE 10 illustrates another elastic vibration generator 341 of the type referred to as a hydroacoustic transducer. This embodiment is constructed in general according to the teachings of Bouyoucos et al. in U.S. Patent No. 3,004,512. Improvements are required, however, in the basic hydroacoustic transducer disclosed by Bouyoucos so that it may be employed in the new drilling method of the present invention. Moreover, a mud coupler is required in order to generate pressure variations directly in the drilling fluid at the borehole bottom.

The hydroacoustic transducer 341 of FIGURE 10 has a hollow body member 343 having connecting means such as threads 345 at its upper end for engagement with a drill collar and similar connecting means 347 at its lower end for connection with a drill bit. A sleeve 349 is removably secured to body 343 by suitable means such as threads 351 to define therebetween annular gaps 353, 355 and 357. Sleeve 349 can be formed integrally with body 343, but this complicates manufacture and makes maintenance difficult. In annular gap 355 there is disposed an annular valve 359 that floats freely, i.e., without mechanical attachment to either body 343 or sleeve 349, as may be seen more clearly in FIGURE 13.

The portions 353 and 357 of gap 355 above and below valve 359 are slightly wider than the valve, a small clearance C being provided between the valve 359 and sleeve 349. Similar clearance is provided between the valve 359 and body 343. A plurality of feet 361 protrude from each end of valve 359 and these also have clearance C from sleeve 349 and body 343. Consequently, there is no physical contact between parts in the static condition illustrated, and similarly, there is no contact during operation of the device, but this will be described in detail later.

The sleeve 349 has a radial discharge opening 363 which registers with a similar opening 365 in valve 359 when the latter is in its middle position. At its lower end, the sleeve 349 is unsupported and surrounds resonator 367 so that each member is free to move with respect to the other, the only restraint being an O-ring 369 provided to prevent leakage. Resonator 367 has an axial length corresponding to a half wavelength of the sound waves generated by the hydroacoustic transducer, and is threadedly secured to body 343 at its midpoint 371 so that each of the upper and lower portions is a quarter wavelength long. Above and below its midpoint 371 are clearances 373 and 375 between body 343 and sleeve 349. The midpoint 371 of resonator 367 is a displacement node and each of its upper 377 and lower ends 379 is a displacement antinode (pressure node).

Body 343 has a longitudinal passage 381 containing at least one, but preferably several, two-legged passageways or tubes 383. As illustrated in FIGURE 10, each tube 383 has a straight-through vertical leg 385 and an open vertical leg 387, the latter terminating in ends 389 and 391 located near its midsection, these ends being inserted in passages 393 and 395, which extend transversely through body 343 and communicate with gaps 353 and 357 at each end of valve 359. At the upper end of each tube 383, the legs 385 and 387 are joined and provided with an aperture 397 through which drilling mud enters from passage 381, while their lower ends are joined without such aperture. Instead of tubes 383, drilled holes may be formed inside body 343, but the tubular members 383 are illustrated merely because they are easily constructed. The method in which these tubes are formed is not critical in practicing the invention.

*Operation of the apparatus of FIGURES 10 through 13*

In operation, the elastic vibration generator 341 is inserted above the bit 69 as is shown in FIGURE 4. Rotary action is transmitted to the drill string and the bit by rotation of rotary table 71 acting through Kelly 73. The mud pump 87 circulates mud through the drill string to the bottom of the hole and then to the surface of the earth.

The mud inside the drill string and thus inside longitudinal passage 381 of the hydroacoustic transducer 341 of FIGURE 10 is subjected to a higher pressure than the mud outside the transducer. Consequently, mud flows through apertures 397, through tubes 383, through radial passages 393 and 395 of body 343 into gaps 353 and 357, into space 355 around valve 359, and out openings 365 and 363 into the upwardly flowing mud stream.

The action of the flowing mud is used to vibrate valve 359 in the manner described in the Bouyoucos et al. Patents 2,793,804; 2,859,726 and 3,004,512, especially the latter. The rapid longitudinal movement of the valve 359 creates elastic vibrations in spaces 353 and 357 above and below the valve. The resonator 367 is in effect an acoustic coupler that transmits acoustic waves to the drilling fluid, being activated by the vibrations in the drilling mud in space 353. Since the resonator 367 has a length equal to one-half of the wavelength of the frequency of elastic vibrations generated in space 353, a standing wave pattern is created therein. Thus, the lower end 379 of the resonator vibrates longitudinally, creating pressure variations of large amplitude that travel through the drilling mud to the borehole bottom.

The frequency at which the valve 359 oscillates is a function of the compressibility of the drilling fluid in annular spaces 353 and 357 and the mass of valve 359. Since the compressibility of the drilling fluid is substantially constant even though its composition varies widely, the frequency can be controlled conveniently by merely changing the mass of valve 359.

In FIGURES 10 and 13 are illustrated a plurality of feet 361 protruding from each end of valve 359. The purpose of these feet is to stabilize the valve to prevent any mechanical contact between the valve 359 and sleeve 349 and body 343. This feature will increase the life of the valve 359 as taught in the patent of Bouyoucos et al. in U.S. Patent No. 3,004,512. To increase fluid film pressure it is preferable to spin the valve about its longitudinal axis, as is also taught by Bouyoucos et al. For this reason passages 393 and 395 and tube ends 389 and 391 are disposed to discharge transversely but not radially into spaces 353 and 357, as may be seen in FIGURE 12. The resulting impingement of the fluid against feet 361 with a circumferential force component rotates valve 359.

The use of one tube 383 is impractical since this tends to create nonuniform forces on the ends of valve 359. Nonuniform forces of this nature cause the valve to wobble, increasing the probability of mechanical contact. The pressure should be equalized, and for this reason a plurality of tubes 383, as is shown in FIGURES 10, 11 and 12, are spaced uniformly about body 343.

*Description and operation of the apparatus of FIGURES 14 and 15*

FIGURES 14 and 15 illustrate an embodiment of an elastic vibration generator taught by Bodine in U.S. Patent No. 3,111,931, and by Warren in U.S. Patent No. 3,016,066. In this type elastic vibration generator there are again no pistons, valves or other moving parts which may become stuck and cause the device to malfunction. In this type generator 401 an annular cavity 403 surrounding the body of an elastic generator sub 405 serves as a primary or Helmholtz resonator and drives a secondary resonator 407 secured at its axial midpoint 409 to the body of the sub but otherwise free to vibrate longitudinally. The overall length of the resonator is one-half a wavelength of the operating frequency, one-quarter of a wavelength between "receiving" end 411 and midpoint 409, and one-quarter of a wavelength between midpoint 409 and "transmitting" end 413. Sleeve 415 is threaded to the sub body 405 to close annular cavity 403 and threadedly engages secondary resonator 407 at its midpoint 409. O-ring 417 prevents leakage between resonator 407 and body 405, but such are otherwise free to move axially with respect to one another. Bit 419 is threaded to the lower end of sub body 405, and it will be seen that lower end 413 of resonator 407 is in position to transmit vibrations directly to the drilling fluid surrounding the bit.

A plug 421 threaded into an opening in the upper end of sub 405 has a passageway 423 constricted at 425 to form a nozzle, beyond which the passage diverges at 427 and finally divides into central passage 429 and diagonal passage 431, the latter extending into resonator channel 403. A short tube 433 is secured in the upper end of central passage 429, the upstream end 435 of such tube converging with reduced opening slightly to one side of the axis of the passage 427.

Fluid pulses into central passage 429 and diagonal passage 431 are controlled by feedback channels 437 and 439, the former extending from scoop orifice or elbow 441 in central passage 429 through forward lateral channel 443, axial channel 445 and rearward lateral channel 447, terminating with the plane of its orifice approximately parallel to the axis of the device. Similarly, feedback channel 439 consists of scoop orifice or elbow 449 with its orifice disposed in diagonal passage 431, forward lateral channel 451, axial channel 453 and rearward lateral channel 455 terminating with the plane of its orifice approximately parallel to and diametrically opposite that of channel 447.

Channels 443, 445, 447, 451, 453, and 455 are formed by drilling holes in sub body 405, the holes extending to the outside of the sub for manufacturing convenience and the unused portions of such holes being thereafter filled with plugs 457 and 459.

The length and cross section of each of these feedback channels 437 and 439 are acoustically tuned to have a characteristic time delay between the time for a pressure wave enters the scoop orifice 441 (or 449) and the time when it appears at the open and of transverse channel 447 (or 455). Such time delay is adjusted for the density of the flushing fluid so that the pressure rise in chamber or cavity 403 is allowed time to reach its maximum, after which a pressure rise at the exit port of transverse channel 455 deflects the fluid from diagonal passage 431 and into central passage 429. During the next half cycle of the resonant frequency of cavity 403, flushing fluid flows downwardly through central passage 429. A similar time delay in feedback channel 437 delays the manifestation of a compression wave at the exit port of lateral passage 447, and when such pressure rise is felt there, the fluid stream is switched back into diagonal channel 431. Thus, the fluid stream downwardly through the elastic vibration generator 401 is caused to be switched or deflected between passages 429 and 431 at half cycle intervals of the resonant frequency of cavity 403.

The net effect of the switching operations described above, insofar as the present invention is concerned, is to generate high amplitude elastic vibrations in the upper end 411 of resonator 407. It should also be mentioned that the impedance of secondary resonator 407 must be matched to the contacting medium at both its upper and lower ends to permit efficient transfer of energy from the fluid adjacent end 411 to the fluid adjacent end 413.

It will be apparent to those of average skill in the acoustic art that the design of resonator 407 and adjacent parts may, if desired, be varied to make the lower part of the bore hole, surrounding bit 419 and the lower end of the resonator, a second Helmholtz resonator to further enhance the resonance of the system and maximize the amplitude or pressure fluctuations transmitted by the drilling fluid to the bottom of the borehole.

*Advantages and summary*

The frequencies used in the practice of the present invention may vary from the very low, e.g., 30 c.p.s., to relatively high, e.g., 1000 cycles per second. The preferred amplitude will depend largely on the pressure differential across the filter cake in permeable formations, and preferable should reduce such differential nearly to zero as the varying pressure passes through its minimum values. In impermeable rock, the preferred amplitude depends somewhat on the mud column pressure on bottom and pressure variations of about 1000 p.s.i. above and below the average hydrostatic pressure are more than adequate to effect a substantial increase in drilling rate when drilling in permeable rock.

From the foregoing description, it is apparent that an invention having significant advantages has been provided. The improved method for drilling boreholes in the earth significantly increases the drilling rates otherwise obtainable with conventional rotary drilling practices. Such increases are obtained by cyclically reducing bottom hole pressure, cyclically increasing jet velocity and cyclically increasing bit load by coupling an elastic vibration generator with the drilling fluid in the cavity surrounding the drill bit. When jet bits are used, the elastic vibrations are coupled with the drilling fluid downstream from the bit nozzles so that the high impedance of the nozzles does not interfere with the transmission of the elastic vibrations to the cavity surrounding the drill bit. The elastic vibrations should be effectively coupled with the drilling fluid in the bit cavity and substantially acoustically isolated or insulated from the drill string members to prevent vibrations from passing directly through the drill string structure from the elastic vibration generator or coupling device, and the fluidic coupling devices do so to advantage. The absence of moving solid mechanical components in the fluidic coupling devices adds ruggedness and long life to the apparatus. When using fluidic coupling devices, the possibilities for fatigue failures are reduced and the impedance of the elastic vibration generator may be conveniently matched to the bit nozzle load impedance for efficient energy transfer.

The combination of the elastic vibration generator, the coupling device, and the Helmholtz resonators limits the dissipation of power upwardly through the fluid in the drill pipe and the annulus. In addition, the use of a shock absorber above the elastic vibration generator limits dissipation of energy upwardly through the metal of the drill string and permits the bit to be more easily cyclically drawn into the earth formation. Thus, the above described apparatus enables the practice of the method in an effective and efficient manner.

While specific advantageous types of apparatus are disclosed above and in the drawings, the practice of our methods is not limited to use with any particular apparatus. There are forms of elastic vibration generators that have not been described, such as the electroacoustic transducers, which may provide advantages when used in practicing the method. Thus, while only a few types of apparatus have been shown and described, it will be apparent to those skilled in the art that the invention in its broadest aspects is not limited to use with any particular apparatus and, moreover, that the apparatus which is shown and described is susceptible to modifications without departing from the scope of the appendant claims.

We claim:

1. An improvement in the rotary method of drilling bore holes in the earth wherein a drill bit having nozzle means for discharging fluid on a bore hole bottom is secured on the end of a drill string, rotated, and urged into the bore hole bottom with a selected force to form cuttings that are washed by the fluid to the surface of the earth through the annulus between the bore hole and the drill string, the improvement comprising:

effecting cyclic reductions in the pressure of the fluid in the vicinity of the bore hole bottom; and simultaneously effecting cyclic increases in the velocity of the fluid discharged from the nozzle means.

2. The invention defined by claim 1 wherein the frequency of said cyclic reductions in the pressure of the fluid lie in a band of about 30 to 1000 cycles per second.

3. The invention defined by claim 1 wherein said method comprises diverting a portion of the drilling fluid through a passage separate from the nozzle means and leading to the bore hole bottom; and effecting elastic vibrations in the fluid in said separate passage.

4. An improvement in the rotary method of drilling bore holes in the earth wherein a drill bit having nozzle means for discharging high velocity fluid on a bore hole bottom is secured on the end of a drill string, rotated, and urged into the bore hole bottom with a selected force to form cuttings that are washed by the fluid to the surface of the earth through the annulus between the bore hole and the drill string, the improvement comprising:

effecting cyclic reductions in the pressure of the fluid in the vicinity of the bore hole bottom;

simultaneously effecting cyclic increases in the velocity of the fluid discharged from the nozzle means and simultaneously cyclically increasing the force with which the drill bit is urged into the bore hole bottom.

5. The invention defined by claim 4 wherein said cyclic reductions in the pressure of the fluid lie in a band of about 30 to 1000 cycles per second.

6. An improvement in the rotary method of drilling bore holes in the earth wherein a drill bit having a nozzle means for discharging fluid on a bore hole bottom is secured on the end of a drill string, rotated, and urged into the bore hole bottom with a selected force to form cuttings that are washed by the fluid to the surface of the earth through the annulus between the bore hole and the drill string, the improvement comprising:

diverting a portion of the fluid upstream of the nozzle means and inside the drill string into a separate passage;

effecting elastic vibrations in the fluid in the separate passage;

discharging the liquid in the separate passage into the bore hole adjacent the drill bit and downstream from said nozzle means; and simultaneously maintaining essentially constant pressure immediately upstream of said nozzle means.

7. The invention defined by claim 6 where said elastic vibrations lie in a band from about 30 to 1000 cycles per second.

8. A method of drilling deep holes with increased penetration rates comprising rotating a drill bit at the lower end of a drill string in the conventional manner, the drill string members having smaller outside diameters than the bit to define an annulus with the sidewall cut by the bit, at least a portion of the weight of the drill string resting on the bit; circulating a drilling mud downwardly through the drill string, through at least one flow restriction means in the bit, and up the annulus; and effecting cyclic variations in the pressure of the drilling mud surrounding the bit by using a coupling device to couple an elastic vibration generator with said drilling mud downstream from said flow restriction means, said coupling device and said generator being substantially acoustically isolated from the drill string members to prevent vibrations from passing directly through the drill string structure from the elastic vibration generator or coupling device to the drill bit.

9. In the rotary method of drilling bore holes in the earth wherein a drilling fluid is circulated through a drill bit, the improvement comprising varying the pressure of the drilling fluid surrounding the drill bit about its average value by acoustically coupling an elastic vibration generator with said drilling fluid on the exterior of the drill bit, said coupling device and said generator being substantially acoustically coupled with the drill bit by energy transmission from coupling device to the drilling fluid in the vicinity of the drill bit and then to the drill bit exterior but otherwise acoustically decoupled therefrom.

10. The improvement in wellbore drilling methods of the type wherein a bit depends from the lower end of a drill string and is loaded to exert a force on the rock at the bottom of the wellbore, and wherein said drill string is connected to surface equipment which supplies drilling motion to the bit and circulates drilling fluid through nozzle means in the bit to the bottom and back to the surface, said improvement comprising generating acoustic vibrations that cause the pressure of the drilling fluid in the vicinity of said bit to undergo periodic excursions from its average value by using a coupling device to couple an elastic vibration generator with the drilling fluid in the cavity defined by the exterior of the drill bit and the wall and bottom of the bore hole while acoustically isolating the coupling device and generator to prevent vibrations from passing directly through the drill string structure from said generator or said coupling device to the drill bit.

11. In drilling methods which involve suspending a drill bit from a string of hollow pipe and simultaneously applying torque and weight to the string to force the bit into a rock formation to form cuttings and produce an ever deepening hole therein, meanwhile flushing the cuttings formed by the bit out of the hole by nozzle means directing a circulating flushing fluid toward the bore hole bottom, the basic improvement of periodically varying the pressure of the flushing fluid at the bottom of the hole about an average value by means of an elastic vibration generator and a coupling device that transmits pressure vibrations to the flushing fluid surrounding the bit, the amplitude of such pressure variations being comparable to the magnitude of the difference between such flushing fluid average pressure and the pressure of any formation fluid present in any interconnected pores of the rock at the bottom of the hole, and said generator being substantially acoustically coupled with the drill bit by energy transmission from said generator to said coupling device to the drilling fluid adjacent the drill bit but otherwise acoustically decoupled therefrom.

12. The improvement of claim 11 in which the frequency of such vibrations lie in a band of from about 30 to about 1000 cycles per second.

13. An improvement in the heretofore standard rotary drilling method in which a drill bit including nozzle means is suspended from the lowermost of a string of hollow pipe members is loaded and rotated to cause the bit to turn and drill cuttings from a rock formation, simultaneously circulating a drilling fluid down the drill string, through the nozzle means in the drill bit, and up on the outside of it to carry such cuttings out of the hole gradually formed by such drilling, comprising adding between the bit and said lowermost drill string member a tubular device having a central flushing fluid passage registering with corresponding passages in the drill string member and the bit and also having a second passage branching off from said central passage and leading to an elastic vibration generator capable of being operated by a flow of flushing fluid to produce pressure fluctuations in in the fluid surrounding said bit, circulating a flushing fluid through said drill string, bit and device to obtain said pressure fluctuations while maintaining essentially constant pressure immediately upstream of nozzle means in the drill bit.

14. Apparatus for generting and transmitting elastic vibrations to the drilling fluid in the cavity surrounding the drill bit during earth boring operations, said apparatus comprising:
 (a) an elastic vibration generator adapted to be carried by a drill string member; and
 (b) an acoustic coupling device also adapted to be carried by a drill string member to communicate with said elastic vibration generator and being acoustically coupled with the drilling fluid in said cavity to cyclically reduce bottom hole pressure and being acoustically isolated from the drill string members, to prevent vibrations from passing directly through the drill string structure from said generator or said coupling device to the drill bit.

15. The invention defined by claim 14 wherein a shock absorber is connected with the drill string members ½ wave length of the generated wave in a steel or a multiple thereof above the drill bit.

16. An acoustic coupler device adapted to be driven by a fluidic vibration generator having two outlet legs, said coupling device comprising:
 (a) one flow passage which communicates with one output leg of said generator and the exterior of the device to transmit the elastic vibrations to the drilling fluid in the cavity which surrounds a drill bit during earth boring operations; and
 (b) another flow passage connected with the other of the output legs of said generator to invert the phase of the elastic vibrations emitted therefrom and to transmit elastic vibrations to the drilling fluid in the cavity which surrounds the drill bit.

17. The invention defined by claim 16 wherein one flow passage is an inertance and the other flow passage is an inertance-compliance network that essentially inverts the phase of the elastic vibrations traveling through the fluid therein to match the vibrations of the two passages.

18. The invention defined by claim 16 wherein one flow passage is an inertance network and the other of said flow passages is a half wave length delay line to match the vibrations emitted from the two passages.

19. Apparatus for generating and transmitting elastic vibrations to the drilling fluid in the cavity surrounding the drill bit downstream from nozzle means in the drill bit during earth boring operations, said apparatus comprising:
 (a) an elastic vibration generator adapted to be carried by a drill string member;
 (b) an acoustic coupling device also adapted to be carried by a drill string member and communicating with said elastic vibration generator and with the exterior of said drill bit and drill string member, whereby during earth boring operations, elastic vibrations may be transmitted to the drilling fluid in said cavity to cyclically reduce bottom hole pressure, to cyclically increase jet velocity from the nozzle means, and to cyclically increase bit load; and
 (c) a resonator tuned to the frequency of the elastic vibration generator with the entrance thereto positioned ¼ wave length of the generated wave or an odd multiple thereof above the cavity surrounding the bit and in communication with the drilling fluid in the annulus.

20. The invention defined by claim 19 wherein a shock absorber is connected with the drill string members ½ wave length of the generated wave in steel or a multiple thereof above the drill bit.

21. The apparatus defined in claim 18 wherein said elastic vibration generator is a fluidic oscillator.

22. Apparatus for generating and transmitting elastic vibrations to the drilling fluid in the cavity surrounding the drill bit downstream from nozzle means in the drill bit during earth boring operations, said apparatus comprising:
 (a) an elastic vibration generator adapted to be carried by a drill string member;
 (b) an acoustic coupling device also adapted to be carried by a drill string member and communicating with said elastic vibration generator and with the exterior of said drill bit and drill string member, whereby during earth boring operations, elastic vibrations may be transmitted to the drilling fluid in said cavity to cyclically reduce bottom hole pressure, to cyclically increase jet velocity, and to cyclically increase bit load; and
 (c) a resonator tuned to the frequency of the vibration generator with the entrance thereto communicating with the axial passage in the drill string and positioned substantially one half wave length or a multiple thereof above the bit nozzles.

23. The invention defined by claim 22 wherein a shock absorber is connected with the drill string members ½ wave length of the generated wave in steel or a multiple thereof above the drill bit.

24. Apparatus for generating and transmitting elastic vibrations to the drilling fluid in the cavity surrounding the drill bit during earth boring operations, said apparatus comprising:
 (a) an elastic vibration generator adapted to be carried by a drill string member;
 (b) an acoustic coupling device also adapted to be carried by a drill string member and communicating with said elastic vibration generator and with the exterior of said drill bit and drill string member, whereby during earth boring operations, elastic vibrations may be transmitted to the drilling fluid in said cavity to cyclically reduce bottom hole pressure, to cyclically increase jet velocity, and to cyclically increase bit load;
 (c) a resonator tuned to the frequency of the elastic vibration generator with the entrance thereto positioned ¼ wave length of the generated wave or an odd multiple thereof above the cavity surrounding the bit and in communication with the drilling fluid in the annulus; and
 (d) a resonator tuned to the frequency of the vibration generator with the entrance thereto communicating the axial passage in the drill string and positioned substantially one half wave length or a multiple above the bit nozzles.

25. The invention defined by claim 24 wherein a shock absorber is connected with the drill string members ½ wave length of the generated wave in steel or a multiple thereof above the drill bit.

26. An improvement in the rotary method of drilling bore holes in the earth wherein a drill bit having nozzles means for discharging fluid on a bore hole bottom is secured on the end of a drill string, rotated, and urged into the bore hole bottom with a selected force to form cuttings washed by the fluid to the surface of the earth through the annulus between the bore hole and the drill string, the improvement comprising:
 diverting a portion of the fluid upstream of the nozzle means and inside the drill string into a separate passage;
 effecting acoustic vibrations in the fluid in the separate passage;
 acoustically coupling the vibrations in the fluid in the separate passage with the fluid in the bore hole adjacent the bit and downstream from the nozzle means; and
 simultaneously maintaining essentially constant pressure immediately upstream of the nozzle means.

27. In the method of drilling bore holes in the earth by rotating a drill bit, applying weight to the drill bit and circulating fluid down and through the drill pipe and upward through the annulus between the drill string and bore hole wall, the improvement comprising:
generating elastic vibrations;
isolating the elastic vibrations to substantially prevent said vibrations from passing directly through the drill string structure to the bit;
transmitting the elastic vibrations to the fluid in the bore hole adjacent the bit.

28. Apparatus for use in drilling bore holes in the earth by rotating a drill bit, applying weight to the drill bit, and circulating fluid down and through the drill string and bit and upward through the annulus between the drill string and bore hole, said apparatus comprising:
an elastic vibration generator adapted to generate pressure fluctuations in the fluid surrounding the drill bit;
said vibration generator being acoustically isolated from the drill string to substantially prevent said vibrations from passing directly through the drill string structure to the bit; and
coupling means connecting said generator to the fluid in the bore hole adjacent the bit.

29. Apparatus for use in drilling bore holes in the earth by rotating a drill bit, applying weight to the drill bit, and circulating fluid down and through the drill string, bit nozzle means and upward through the annulus between the drill string and bore hole, said apparatus comprising:
an elastic vibration generator adapted to generate pressure fluctuations in the fluid surrounding the drill bit; and
a resonator carried by the drill string and tuned to the frequency of the vibration generator, with the entrance thereto communicating with an axial passage in the drill string and positioned substantially one half wave length or a multiple thereof above the bit to maintain substantially constant pressure upstream of the bit nozzle means.

30. In the method of drilling bore holes in the earth by rotating a drill bit, applying weight to the drill bit and circulating fluid down and through the drill string, through nozzle means, and upward through the annulus between the drill string and bore hole wall, the improvement comprising:
generating pressure fluctuations in the fluid surrounding the bit;
maintaining essentially constant pressure in the fluid immediately upstream of the nozzle means.

31. An improvement in the rotary method of drilling bore holes in the earth in which a drill bit is suspended from a drill string and rotated while circulating a drilling fluid through the drill string, drill bit and up the annulus between drill bit and bore hole, the improvement comprising:
diverting a portion of the fluid flowing through the drill string into a separate passage;
channeling the flow through said passage into two channels;
switching alternately fluid flow from one channel to the other;
substantially inverting the phase of the flow of one of the channels; and
discharging after said phase inversion the flow of fluid from the channels into a fluid filled cavity which has as one of its bounding surfaces the exterior of the drill bit.

32. Apparatus for use in drilling bore holes in the earth by rotating a drill bit, applying weight to the drill bit, and circulating fluid down and through the drill string interior, bit nozzle means and upward through the annulus between the drill string and bore hole, said apparatus comprising:
a fluidic elastic vibration oscillator connected by a fluid input passage to the drill string interior said oscillator having two output channels and fluid control means to alternately switch the fluid flow from one channel to the other;
phase inversion means connected with one of said output channels, the flow of said channels after flow inversion being discharged into fluid cavity which has as one of its bounding surfaces the exterior of the drill bit.

33. Apparatus for generating and transmitting elastic vibrations to the drilling fluid in the cavity surrounding the drill bit during earth boring operations, said apparatus comprising:
a fluidic vibration generator adapted to be carried by a drill string;
a fluidic acoustic coupling device also adapted to be carried by the drill string and communicating with the said generator;
said device communicating with the drilling fluid in the vicinity of the bore hole bottom to cause cyclic variations in pressure therein.

References Cited

UNITED STATES PATENTS

| | | | |
|---|---|---|---|
| 2,672,322 | 3/1954 | Bodine | 175—56 |
| 2,859,726 | 11/1958 | Bouyoucos et al. | 116—137 |
| 2,946,565 | 7/1960 | Williams | 175—56 X |
| 2,951,682 | 9/1960 | Boucher | 175—56 |
| 3,004,512 | 10/1961 | Bouyoucos et al. | 116—137 |
| 3,094,176 | 6/1963 | Cook | 175—56 X |
| 3,111,931 | 11/1963 | Bodine | 116—137 |
| 3,163,240 | 12/1964 | Bodine | 175—56 |
| 3,185,227 | 5/1965 | Nelson | 175—296 X |
| 3,216,514 | 11/1965 | Nelson | 175—56 X |
| 3,251,424 | 5/1966 | Brooks | 175—56 |
| 3,346,058 | 10/1967 | Bouyoucos | 175—56 |

CHARLES E. O'CONNELL, Primary Examiner.

R. E. FAVREAU, Assistant Examiner.

U.S. DEPARTMENT OF COMMERCE
PATENT OFFICE
Washington, D.C. 20231

UNITED STATES PATENT OFFICE
CERTIFICATE OF CORRECTION

Patent No. 3,405,770                                                              October 15, 1968

Edward M. Galle et al.

It is certified that error appears in the above identified patent and that said Letters Patent are hereby corrected as shown below:

Column 1, line 40, "this" should read -- his --. Column 2, line 3, "inoperative" should read -- imperative --. Column 5, line 22, "decreases" should read -- decrease --. Column 6, line 46, "ship" should read -- chip --. Column 7, line 14, "formation" should read -- formations --; line 54, "this" should read -- that --. Column 8, line 9, "devive" should read -- device --. Column 12, line 20, "civities" should read -- cavities --. Column 14, line 7, "fractional" should read -- frictional --.

Signed and sealed this 17th day of March 1970.

(SEAL)
Attest:

Edward M. Fletcher, Jr.                                  WILLIAM E. SCHUYLER, JR.
Attesting Officer                                                Commissioner of Patents